No. 616,376. Patented Dec. 20, 1898.
J. WATSON.
WHEEL FOR VEHICLES.
(Application filed Dec. 31, 1897.)
(No Model.)

Witnesses:
Thomas Durant
Jn. B. Peyton, Jr.

Inventor:
James Watson
by Church & Church
his Attys.

UNITED STATES PATENT OFFICE.

JAMES WATSON, OF NOTTINGHAM, ENGLAND.

WHEEL FOR VEHICLES.

SPECIFICATION forming part of Letters Patent No. 616,376, dated December 20, 1898.

Application filed December 31, 1897. Serial No. 664,939. (No model.)

*To all whom it may concern:*

Be it known that I, JAMES WATSON, a subject of the Queen of England, residing at Nottingham, England, have invented certain new and useful Improvements in Wheels for Road-Vehicles, of which the following is a specification.

This invention relates to vehicle-wheels, and more particularly to wheels for cycles or light road-vehicles of the kind known as "spring-wheels," in which the periphery or tire that runs on the ground is capable of moving relatively to the axis against the action of a spring or springs.

The invention will be best understood by reference to the accompanying drawings, in which—

Figure 1:
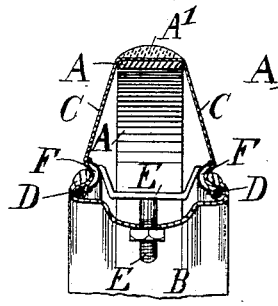
Figure 2:
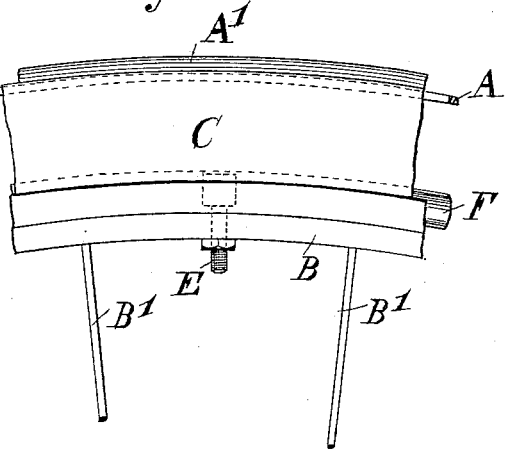
Figure 3:
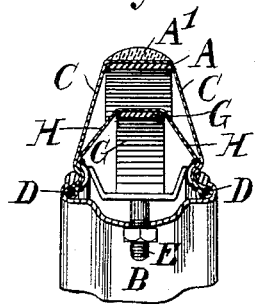
Figure 4:
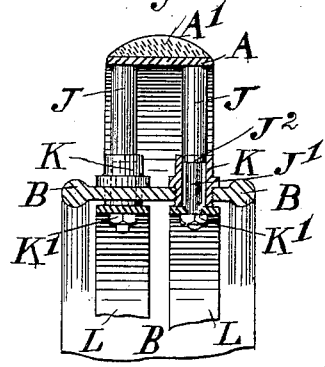

Figure 1 is a cross-section, and Fig. 2 a side elevation, of a part of a wheel constructed according to my invention. Fig. 3 is a cross-section showing a duplex arrangement. Fig. 4 is a cross-section showing an alternative arrangement.

Like letters indicate like parts throughout the drawings.

According to my invention the periphery or outer circumference of the wheel is comprised of an endless spring band or rim formed, preferably, of steel or other elastic material. This spring-band may be connected to the nave or hub or preferably to an intermediate rim of less diameter by convenient means, which are inextensible, and thus maintain the spring-band normally in a concentric position, but are flexible or arranged to slide or contract, and thus do not prevent the movement of any one part of the band toward the center of the wheel. With this arrangement the elasticity or resiliency of the wheels may be wholly obtained from the spring band or rim.

In the arrangement shown in Figs. 1 and 2 the spring band or rim A, which may be formed in one piece or built up of two or more bands, is connected to a rigid intermediate rim $b$, of less diameter, by a cover C, of canvas or other suitable flexible material. The rigid rim B may be connected to the nave or hub of the wheel by spokes B', arranged in a well-known manner. The cover C incloses the spring band or rim A, and its two edges may be secured in the rigid rim B by any well-known arrangement.

As shown in the drawings, wires D are placed in the two edges of the cover C, and the length of these wires and the circumference of the inner and outer parts of the rim B are adjusted in order that the wire may be placed on the rim. They are then held in the position shown by the wedge-shaped heads of the bolts E, which are placed at intervals in the circumference of the rim B.

If preferred, rings F, of semicircular cross-section, may be placed between the wedge-shaped heads of the bolts E and the cover C, and the cover C may thus be tightened by forcing it, at one point on each side, around the inturned edges $B^2$ of the rim by means of the said rings F and bolts E, as shown.

The spring band or rim A may be padded with india-rubber or other suitable material in order to prevent it from injuring the cover C. The latter may also be protected externally by a tread A', of india-rubber or other suitable material, secured to the cover.

If preferred, the wires D may be formed with free ends and be connected and drawn together by means of screwed nuts or by levers or other well-known devices.

The inward movement of the spring-band A may be limited by buffers, stops, or a pneumatic cushion or tire of suitable section placed in the rim B, and the said tire may be so arranged as to hold the wires D in their proper position when it is inflated. The movement of the band A may also be checked by a second spring-band G, placed between the spring-band A and rim B, as shown in Fig. 3.

The spring band or rim G is connected to the rigid rim B by a cover H in the same manner as the outer spring band or rim A. This cover H may be formed independently of or integrally with the cover G, as shown. In the former case it may be secured to the rim B by wires in its edges in the same manner as the cover C.

The space between the two spring-bands A and G is preferably adjusted so that the former is only forced down to the latter by excessive pressure.

In the alternative arrangement shown in Fig. 4, which is adopted for heavier vehicles, the spring band or rim A is connected to the rigid rim B by pins J, preferably secured alternately on each side of the band A. These pins J slide in nipples K, secured in the rim B, and their inner ends are provided with nuts K' to adjust the spring band or rim A and limit its outward movements. In the arrangement shown the inner ends J' of the pins J are reduced, so as to form a shoulder J². The reduced ends J' pass through two spring-bands L, fitting in the interior of the rim B, as shown, and form a cushion for the shoulders J² of the pins J to strike when excessive pressure is applied to the spring-band A. The spring-bands L in this arrangement perform the same office as the spring-band G. (Shown in Fig. 3.) The tread A' is in this case secured to the spring-band A.

If desirable, the arrangement above described and shown in Fig. 4 may be protected from dirt by a cover similar to that shown at C in Figs. 1 and 2.

I claim—

1. In a spring-wheel, the combination with the rigid rim, of an outer spring band or rim, means for restricting the outward movement of the spring band or rim, and a second spring band or rim for limiting its inward movement; substantially as described.

2. In a spring-wheel, the combination with the intermediate rigid rim, of an outer spring band or rim, means for connecting the outer rim and the intermediate rim and a second spring-band for limiting the inward movement of the outer rim; substantially as described.

3. In a spring-wheel, the combination with the intermediate rigid rim, of an outer spring band or rim, the flexible inextensible cover connecting the outer spring band and rim, a second spring band or rim between the outer spring band and rim, and a flexible inextensible cover connecting said second spring band and rim; substantially as described.

4. In a spring-wheel, the combination with the intermediate rigid rim, of an outer spring band or rim, a second spring band or rim between the outer band and rigid rim, and a single flexible inextensible cover connecting the two spring-bands and the rigid rim; substantially as described.

5. In a spring-wheel, the combination with an intermediate rigid rim, having round inturned edges, of an outer spring band or rim, a cover extending around the outer rim, bolts having wedge-shaped heads and the semicircular rings interposed between the wedge-shaped heads of the bolts and the edges of the cover, whereby when the bolts are tightened the edges of the cover will be forced around the inturned edges of the rim by means of the rings; substantially as described.

JAMES WATSON.

Witnesses:
F. C. SHELDON,
J. W. THORMAN.